United States Patent
Sultenfuss et al.

(10) Patent No.: US 8,830,206 B2
(45) Date of Patent: *Sep. 9, 2014

(54) SYSTEMS AND METHODS FOR LOCKING IMAGE ORIENTATION

(71) Applicant: Dell Products, LP, Round Rock, TX (US)

(72) Inventors: Andrew T. Sultenfuss, Leander, TX (US); Stefan Peana, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 63 days.

This patent is subject to a terminal disclaimer.

(21) Appl. No.: 13/646,177

(22) Filed: Oct. 5, 2012

(65) Prior Publication Data

US 2014/0098027 A1    Apr. 10, 2014

(51) Int. Cl.
*G06F 3/045* (2006.01)

(52) U.S. Cl.
USPC .......................... 345/174; 345/173

(58) Field of Classification Search
CPC ......... G06F 3/041; G06F 3/044; G06F 3/045; G06F 3/0346; G06F 3/0414; G06F 3/0488; G06F 3/03547; G06F 2203/04104; G06F 2203/04106
USPC ................... 345/173–178; 178/18.01–18.09, 178/20.01–20.04
See application file for complete search history.

(56) References Cited

U.S. PATENT DOCUMENTS

| | | |
|---|---|---|
| 6,108,409 A | 8/2000 | Cooper et al. |
| 2002/0041605 A1 | 4/2002 | Benussi et al. |
| 2004/0171369 A1 | 9/2004 | Little et al. |
| 2008/0172167 A1 | 7/2008 | Ootake et al. |
| 2008/0222375 A1 | 9/2008 | Kotsovinos et al. |
| 2009/0002385 A1 | 1/2009 | Blixt |
| 2009/0132797 A1 | 5/2009 | Lo |
| 2009/0172041 A1 | 7/2009 | Clarke et al. |
| 2009/0222880 A1 | 9/2009 | Mayer et al. |
| 2009/0327675 A1 | 12/2009 | Cherian et al. |
| 2010/0077396 A1 | 3/2010 | Choi et al. |
| 2010/0088699 A1 | 4/2010 | Sasaki |
| 2013/0342473 A1* | 12/2013 | Sultenfuss et al. ............ 345/173 |
| 2013/0342474 A1* | 12/2013 | Sultenfuss et al. ............ 345/173 |

OTHER PUBLICATIONS

U.S. Appl. No. 13/533,830, filed Jun. 26, 2012.
U.S. Appl. No. 13/533,844, filed Jun. 26, 2012.

* cited by examiner

*Primary Examiner* — Vijay Shankar (74) *Attorney, Agent, or Firm* — Larson Newman, LLP (57) ABSTRACT

An information handling system includes a housing, a processor, memory, and a touch screen display that has a display portion operable to present information as an image. The system also includes a touch controller and an orientation module.

18 Claims, 6 Drawing Sheets

SYSTEMS AND METHODS FOR LOCKING IMAGE ORIENTATION

FIELD OF THE DISCLOSURE

This disclosure generally relates to information handling systems, and more particularly relates to systems and methods for locking image orientation.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Functionality is provided through touches at an information handling system touch screen peripheral zone, such as locking an orientation of an image based upon a touch input.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Figure 1:
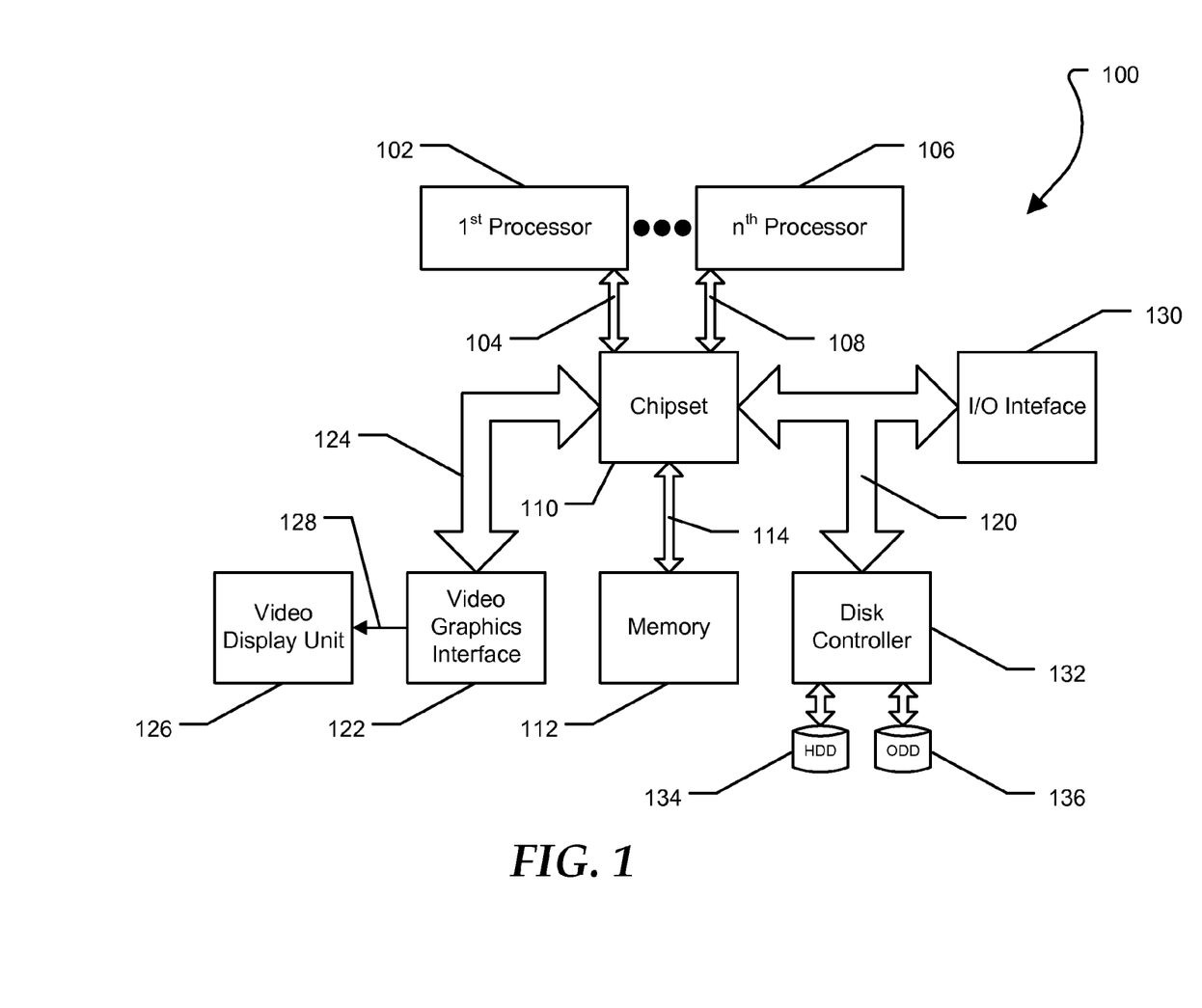
FIG. 1 illustrates a block diagram of an information handling system according to one aspect of the disclosure.

FIG. 1 illustrates a block diagram of an exemplary embodiment of an information handling system, generally designated at 100. For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110, including an AHA enabled-chipset, can include a memory controller hub and an input/output (I/O) controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 MHz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit (I$^2$C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the n$^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

Figure 2:
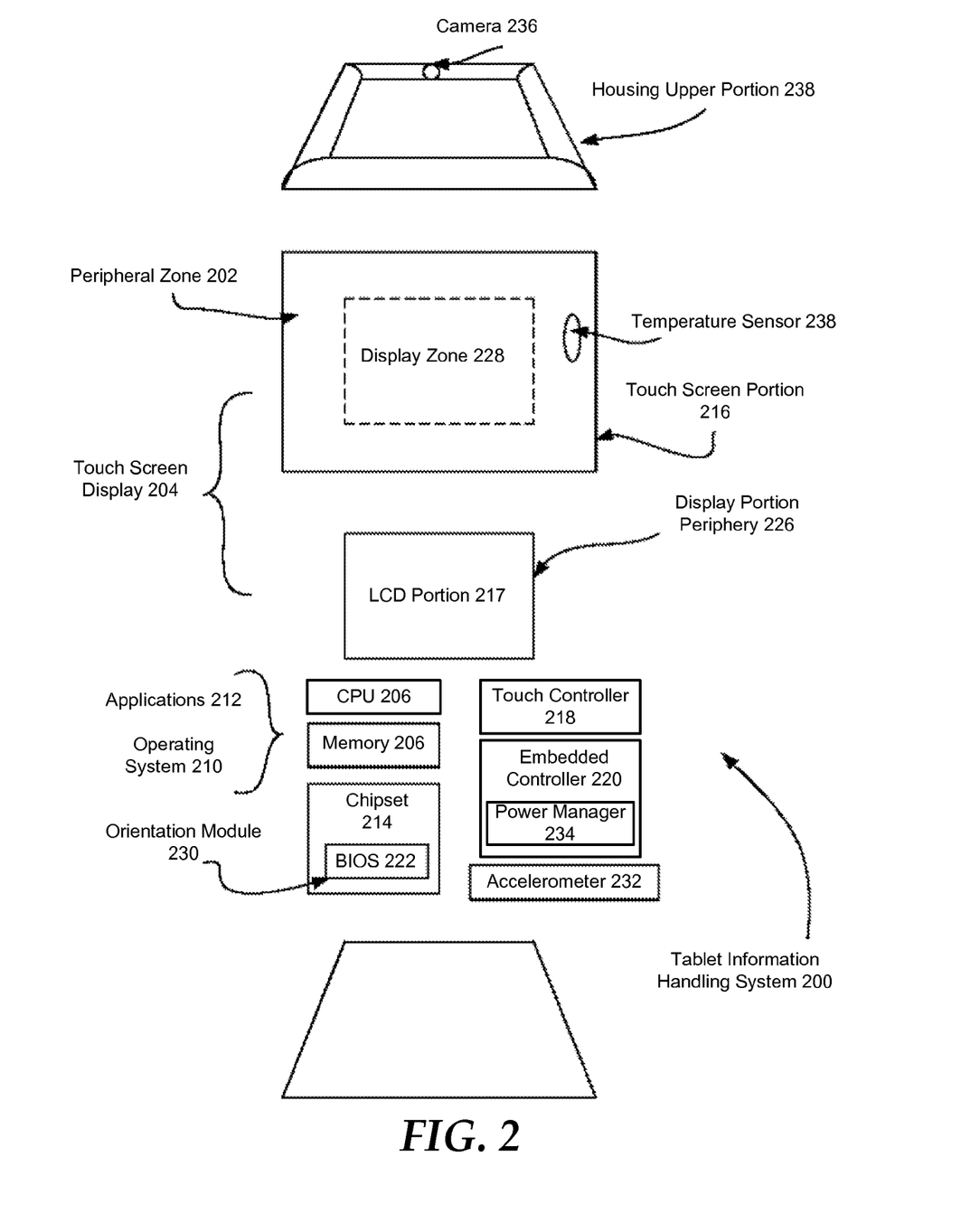
FIG. 2 depicts an exploded view of an example embodiment of a tablet information handling system having functions provided by touches to a peripheral zone of a touch screen display.

FIG. 2 shows an example embodiment of a tablet information handling system 200 having functions provided by touches to a peripheral zone 202 of a touch screen display 204. Tablet information handling system 200 can process information with a CPU 206 that performs instructions stored in a memory 208, such as dynamic random access memory (DRAM), a hard disk drive (HHD) or a solid state drive (SSD). For example, memory 208 can store an operating system 210 that executes on CPU 206 to support one or more applications 212. Information processed by CPU 206 can be presented at touch screen display 204 with graphics logic executing on a processor of a chipset 214, which can provide the information as pixel values to a liquid crystal display (LCD) portion 217 of touch screen display 204. A touch screen portion 216 of touch screen display 204 can rest over LCD portion 217 and can detect touches, such as with a capacitive or resistive sensing array. A touch controller 218 can interface with touch screen portion 216 to determine the location of touches and can provide that location to operating system 210 for use, such as in the same manner as other I/O information communicated by an embedded controller 220 and BIOS 222 to operating system 210. For example, an application 212 can generate visual information for presentation at LCD portion 217 so that an end user can interact with the application by touch inputs at the image. Touch controller 218 can determine the touch position and can provide the position to embedded controller 220 and, in turn, to the operating system 210 for use as input to the application 212. In alternative embodiments, alternative hardware, firmware and software configurations may be used to coordinate translation of touches at touch screen portion 216 into inputs for operating system 210 and/or application 212.

Tablet information handling system 200 can have a main housing that supports assembled components disposed under touch screen display 204, and a housing upper portion 224 that can secure the components and touch screen display to the main housing. Alternatively, touch screen display 204 can rest over the housing and can be held in position with coupling devices from below so that touch screen portion 216 forms the upper surface of tablet information handling system 200. LCD portion 217 of touch screen display 204 can present images within a periphery 226. Touch screen portion 216 covers LCD portion 217 so that touches within a display zone 228 fall inside the periphery 226 of LCD portion 217, and touches in a peripheral zone 202 fall outside the periphery 226 of LCD portion 217. During operations, LCD portion 217 can present images in one of plural orientations based upon the orientation of LCD portion 217 relative to an end user. An orientation module 230 can determine the orientation for presenting images with instructions running as part of BIOS 222 or other logic with the graphics system. One conventional way for orientation module 230 to determine a display orientation is by reference to an accelerometer 232, which can detect a vertical axis based upon acceleration under gravity. If an end user rotates housing 222, orientation module 230 can rotate the orientation of the image presented at LCD portion 217 to maintain the orientation along the vertical axis detected by accelerometer 232.

Tablet information handling system 200 can interact with an end user under the management of the operating system 210, which performs operating system functions. Some non-operating system functions can be managed by firmware, such as instructions executing in BIOS 222, based upon inputs made by an end user with buttons, such as power buttons, speaker volume buttons or display brightness buttons. Some management functions can be performed with and some without the operating system. For example, operating system 210 can present a user interface to which end users make inputs for performing a management function, but the management function can be performed by firmware instructions running in chipset 214, in embedded controller 220 or touch controller 218. Some examples of management functions can include setting a power consumption state with a power manager 234 running on embedded controller 220, such as on, standby, suspend and off power states, setting a display brightness, setting a speaker volume and orienting, and setting display resolution and orientation.

The multi-zone touch screen portion 216 can provide enhanced end user control of inputs to tablet information handling system 200 by accepting inputs in peripheral zone 202 that are independent or interdependent of images presented by operating system 210 in display zone 228. In the example embodiment, touch screen portion 216 can be a single piece of glass that has a surface area greater than the surface area of the LCD portion 216 over which touch screen portion 216 rests. Touch sensing in display zone 228 can be mapped to images presented on LCD portion 217 in a conventional manner; however, touch sensing in peripheral zone 202 can also be activated to provide non-operating system, management, and control functions. In the example embodiment, peripheral zone 202 can provide touch sensing at an equal distance outside of the periphery of display zone 228. In alternative embodiments, peripheral zone 202 can provide different amounts of touch sensing on different sides of display zone 228 based upon the placement of touch sensing portion 216 relative to display portion 217. For instance, an off center placement of touch screen portion 216 relative to LCD portion 217 can allow most or all of peripheral zone 202 to fall on one side of touch screen display 204. In one embodiment, portions of peripheral zone 202 can cross into display zone 228 so that touch sensing in that shared zone provides both display zone and peripheral zone touching.

In operation, an end user interacts with operating system 210 and applications 212 through touches at display zone 228 based upon images presented at LCD portion 217. The end user can also interact with non-operating system and management functions of tablet information handling system 200 through touches at peripheral zone 202. Examples of interactions supported through peripheral zone 202 can include power management by power manager 234, display setting management by BIOS 222, speaker setting management by BIOS 222, and image orientation management by orientation module 230. Although power manager 234, BIOS 222 and orientation module 230 are depicted as firmware modules running on processors in chipset 214, in alternative embodiments they may run on alternative hardware, such as embedded controller 220 or touch controller 218, or may run as software supported by CPU 206. Orientation module 230 can establish the orientation of an image presented at LCD portion 217 relative to housing 222 based upon intentional or unintentional inputs made at peripheral zone 202; however, orientation module 230 may include inputs from other sensors to aid in selection of an image orientation, such as accelerometer 232, camera 236 and temperature sensors 238.

Figure 3:
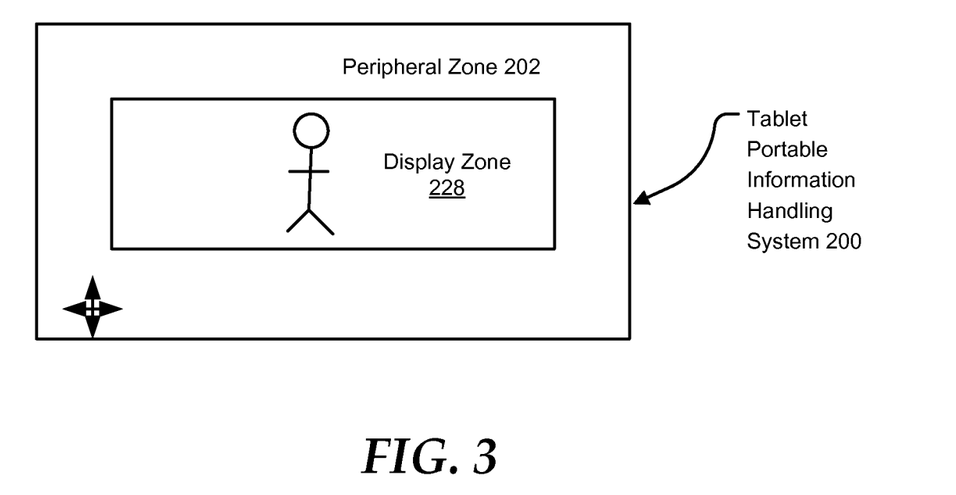
FIG. 3 depicts the tablet information handling system with an image presented in a first orientation.

FIG. 3 shows the tablet information handling system 200 with an image presented in a first orientation. Display zone 228 can align over LCD portion 217 to support end user inputs. Peripheral zone 202 can surround display zone 228 to accept non-operating system and management inputs. Indicators can be provided at peripheral zone 202 to aid end user interaction. For example, an orientation indicator 240 can be presented to allow an end user to touch at an arrow to automatically changing the display orientation to the direction of the arrow.

Figure 4:
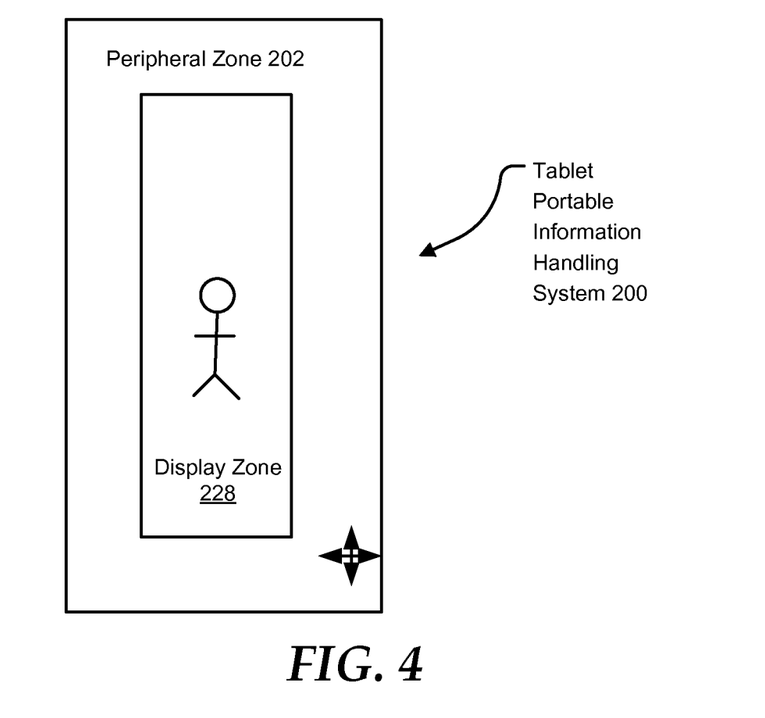
FIG. 4 depicts the tablet information handling system with the image presented in a second orientation.

Referring now to FIG. 4, the tablet information handling system 200 is depicted with the image presented in a second orientation. The image orientation changes based upon an automated analysis as set forth below or a manual end user selection. An orientation indicator 240 can provide an arrow for each direction that an orientation selection is available. An end user can touch the direction desired in the peripheral zone to command an orientation change. In one embodiment, the image orientation can change to the selected direction and the indicators presented within peripheral zone 12 can remain in the same position, as depicted by FIG. 4. Alternatively, indicators presented in peripheral zone 202 can also realign to the newly selected orientation. In another alternative embodiment, operating system 210 can coordinate inputs through peripheral zone 202 by presenting images in display zone 228 that indicate a location of peripheral zone 202 for making an input to perform a function.

Figure 5:
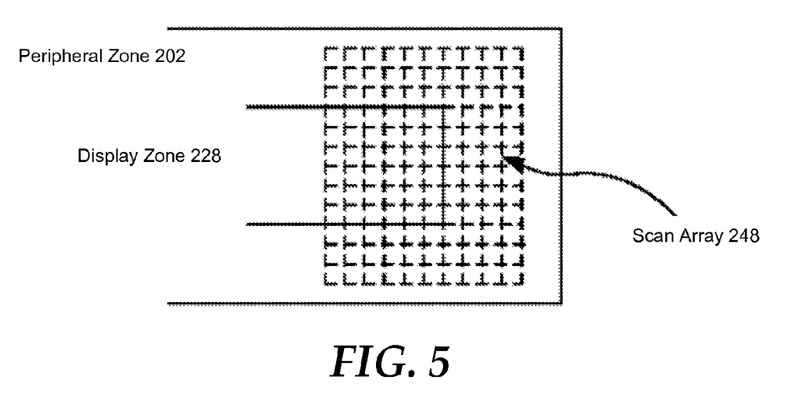
FIG. 5 depicts an example embodiment of scan array density for a touch screen across display and peripheral zones.

Referring now to FIG. 5, an example embodiment is depicted of a scan array density for a touch screen portion 216 across display and peripheral zones 228 and 202. In the depicted embodiment, touch screen portion 216 can be a single piece of transparent material with a scan array 58 having a footprint that is greater than the footprint of a display LCD portion 27 disposed beneath touch screen portion 216. Although the scan array density available in the display zone 228 and peripheral zone 202 can be the same, a lesser scan density may be used for peripheral zone 202 to save power. The reduced scan density may be implemented during reduced power states or may be hardwired. Further, scan array 248 may include different touch detection settings and methods for display zone 228, which uses precise touch measurements, and peripheral zone 202, which operates with less precise inputs. For example, display zone 228 may have a greater capacitive sense gain that allows detection of smaller touches than a higher capacitive sense gain in peripheral zone 202. Alternatively, peripheral zone scan array sensors may use resistive detection of touches while display zone scan array sensors use capacitive detection.

Figure 6:
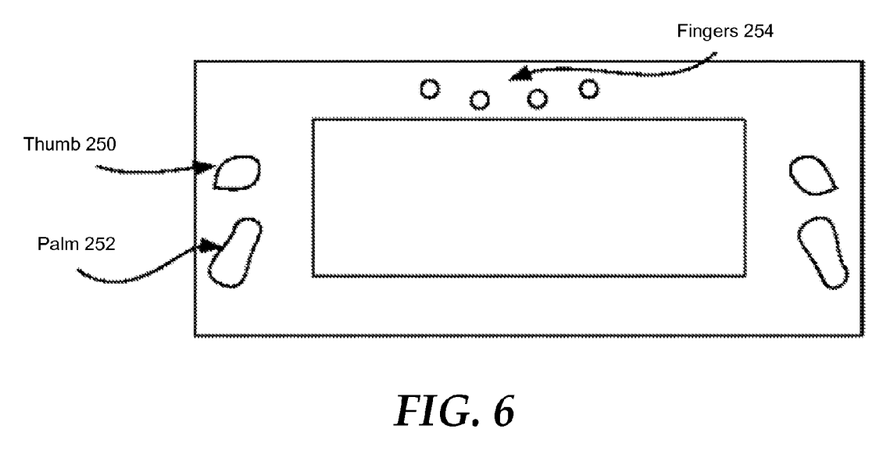
FIG. 6 depicts touches at a peripheral zone that are analyzed to determine an orientation for presenting images.

Referring now to FIG. 6, touches at a peripheral zone 202 are depicted that are analyzed to determine an orientation for presenting images. In the example embodiment, orientation module 230 can analyze touches at peripheral zone 202 to identify touches associated with an end user grasp of tablet information handling system 200 and, in response to detection of a grasp, can align the image presented at LCD portion 217 with an upright position associated with the detected grasp. One type of grasp that can indicate an orientation is a thumb touch 250 at each of opposing sides of peripheral zone 202. For example, orientation module 230 can analyze the size, shape and direction of the touch to determine an orientation for presenting images. In addition, if a palm touch 252 is detected then further confirmation of the orientation can be provided. Another type of grasp is a fingers grasp indicated by finger position touch 64, which can indicate a back hand grasp with the fingers positioned at the upward orientation. In alternative embodiments, alternative grasps may be used to detect orientation. In one embodiment, orientation module 230 can track end user usage patterns to model touches associated with predetermined orientations.

In combination with touches to the peripheral zone 202 that indicate a grasp, orientation module 230 may use other sensor inputs to determine orientation. For example, touches that indicate a grasp can be combined with indications of an accelerometer 232 to determine an orientation for presenting images. In particular, grasp touches can provide valuable inputs for determining orientation when tablet information handling system 200 is placed in a flat orientation so that accelerometer sensor results are not conclusive as to orientation. In another embodiment, grasp touches can be used in combination with images captured by camera 236 to determine an orientation relative to the end user, such as by analyzing the image to have the orientation set as the vector from the end user's chin to eyes. In yet another embodiment, temperature sensors 238 can confirm a grasp touch by the increase in temperature proximate to the grasp.

Figure 7A:
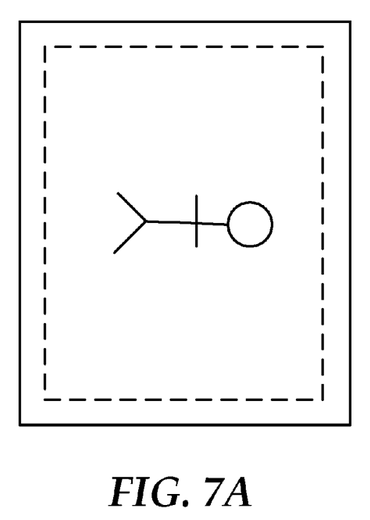
FIGS. 7A-7C depict diagrams illustrating the relative orientation of an image presentation on a display device.
Figure 7B:
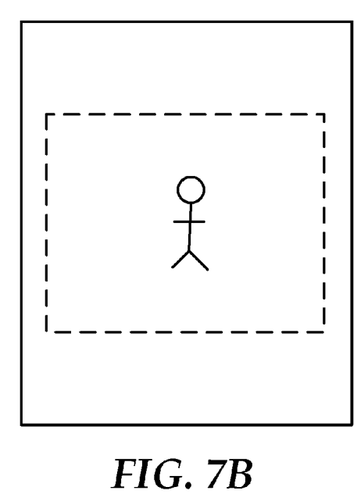
Figure 7C:
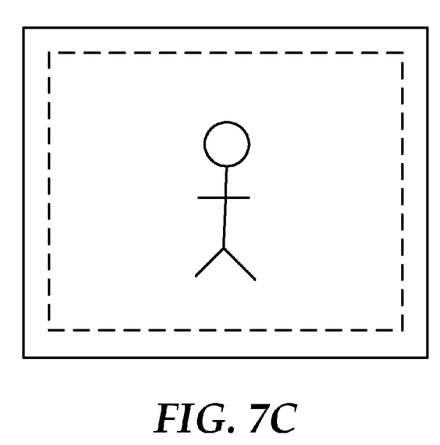

In various embodiments, an end user can use an image orientation lock gesture to lock the rotation of an image within the display zone 228. In particular embodiments, use of an image orientation lock gesture in the peripheral zone 202 can be used to lock the rotation of the display, thereby preventing unwanted rotations. In other particular embodiments, use of the image orientation lock gesture can be used to lock the orientation of an image or window within the display zone 228. For example, referring to FIG. 7A, a photographic image may appear sideways in the display when the major axis of the display is aligned to the major axis of the image. To resolve this, the end user may rotate information handling system 200 to orient the image in an upright direction, as in FIG. 7B. However, the major axis of the display may no longer be aligned to the major axis of the image, causing the image to be scaled so that the major axis of the photographic image fits the minor axis of the display. By using the image orientation lock gesture, the end user can lock the orientation of the photographic image, with respect to the up orientation of information handling system 200. The orientation of the information handling system can then be rotated to align the major axis of the display with the major axis of the photographic image, allowing the photographic image to scale to substantially fill the display while maintaining a desired upright orientation, as illustrated in FIG. 7C.

Figure 8:
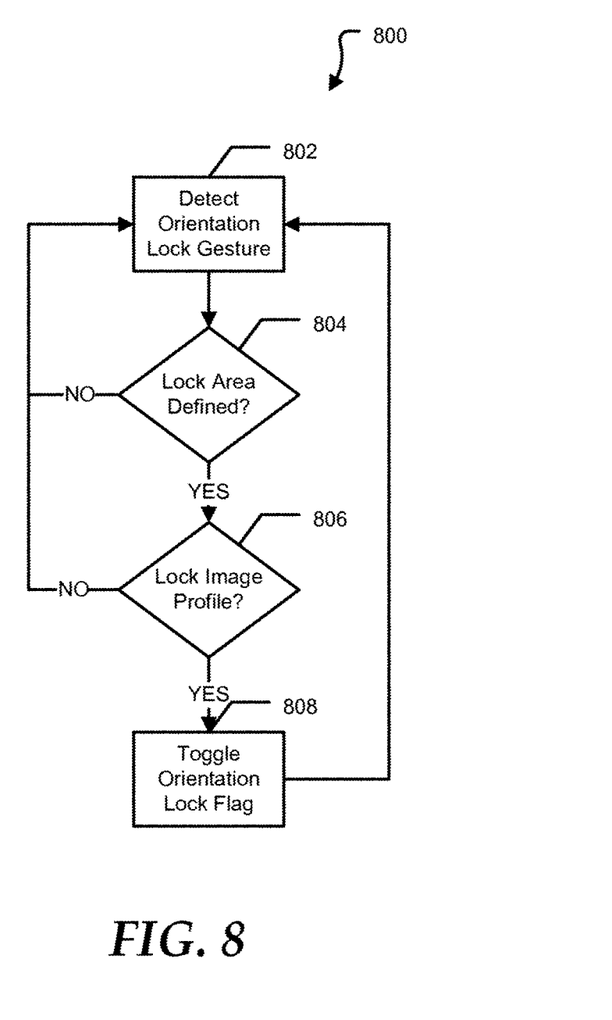
FIG. 8 depicts an exemplary process for locking an image orientation based on a touch input.

Referring now to FIG. 8, a flow diagram depicts a process for locking an image orientation based on touch input. At step 802, a gesture for locking orientation of an image can be detected. In various embodiments, the gesture may be in peripheral zone 202. In other embodiments, the gesture may be detected in display zone 228. At 804, a determination can be made if a lock area has been defined. For example, when an image orientation lock gestures is detected in peripheral zone 202 the lock area may correspond to an image that fills the entire display area or to a currently active image. In another example, when an image orientation lock gesture is detected in the display area 228, the lock area may be defined as an image shown on the display in the area of the image orientation lock gesture. To define the lock area, the image orientation lock gesture may occur on a defined portion of an image, such as a corner of the image. When the lock area is undefined, such as when the image orientation lock gesture does not clearly indicate an image to be orientation locked, the process may return to 802 to detect additional gestures.

Alternatively, when the lock area is defined, a determination can be made at 806 to determine if a lock image profile is defined or matched. When the lock image profile is not defined or matched, the process may return to 802 to detect additional gestures. Alternatively, when the lock image profile is defined or matched, an orientation lock flag can be toggled at 808. Setting the image orientation lock flag can indicate that the orientation of an image is locked. Unsetting the image orientation lock flag can release the orientation of the image and allow the image to rotate based on other indications of orientation. The processes may return to 802 to detect additional gestures.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a housing;
   a processor disposed in the housing and operable to execute instructions;
   memory interfaced with the processor and operable to store the instructions;
   a touch screen display integrated with the housing and interfaced with the processor, the touch screen display having a display portion operable to present information as an image in at least a first and a second orientation and a touch portion operable to detect touches, the touch portion having a first zone that overlaps the display portion and a second zone that extends outside of a periphery of the display portion;
   a touch controller interfaced with the touch portion and operable to detect touches in the first and second zones; and
   an orientation module operable to analyze touches in the second zone and to lock the image in the first or the second orientation within the display portion in response to the touches in the second zone.

2. The information handling system of claim 1, wherein the orientation module toggles an orientation lock flag.

3. The information handling system of claim 1, wherein the image is an orientation lock gesture.

4. The information handling system of claim 1, wherein the image fills the touch screen display.

5. The information handling system of claim 1, wherein the image is within a portion of the touch screen display.

6. The information handling system of claim 5, wherein a second image with a second orientation is within a second portion of the touchscreen display, and the second orientation is changed in response to an orientation indicator while the orientation of the image remains unchanged.

7. A method for interacting with an information handling system, comprising:
   presenting an image at a display;
   receiving a touch input; and
   locking the orientation of the image in response to the touch input.

8. The method of claim 7, further comprising receiving a second touch input, and unlocking the orientation of the image in response to the second touch input.

9. The method of claim 7, wherein the touch input is an image orientation lock gesture.

10. The method of claim 7, wherein the image fills the display.

11. The method of claim 7, wherein the image feels a portion of the display.

12. The method of claim 11, wherein a second image with a second orientation is within a second portion of the touchscreen display, and the second orientation is changed in response to an orientation indicator while the orientation of the image remains unchanged.

13. A touch screen display comprising:
   a display portion operable to present information as an image, the display portion having a periphery;
   a single touch surface disposed over the display portion and operable to detect touches, the touch surface extending past at least a portion of the display periphery;

a touch controller interfaced with the touch surface and operable to distinguish between touches at the touch surface within the display periphery and outside the display periphery; and an orientation module operable to analyze touches outside the display periphery and to perform a function to lock an orientation of the image in response to the touches outside the display periphery.

14. The touch screen display of claim 13, wherein the function toggles an orientation lock flag.

15. The touch screen display of claim 13, wherein the touches consist of an orientation lock gesture.

16. The touch screen display of claim 13, wherein the image fills the display.

17. The touch screen display of claim 13, wherein the image is within a portion of the display.

18. The touch screen display of claim 17, wherein a second image with a second orientation is within a second portion of the display, and the second orientation is changed in response to an orientation indicator while the orientation of the image remains unchanged.

* * * * *